(12) United States Patent
Musto (10) Patent No.: US 9,150,274 B1
(45) Date of Patent: Oct. 6, 2015

(54) MOTORCYCLE FRAME SUSPENSION SYSTEM

(71) Applicant: Terence M. Musto, Altamont, NY (US)

(72) Inventor: Terence M. Musto, Altamont, NY (US)

( * ) Notice: Subject to any disclaimer, the term of this patent is extended or adjusted under 35 U.S.C. 154(b) by 0 days.

(21) Appl. No.: 14/045,638

(22) Filed: Oct. 3, 2013

Related U.S. Application Data (60) Provisional application No. 61/709,793, filed on Oct. 4, 2012.

(51) Int. Cl.
*B62K 11/02* (2006.01)
*B62K 25/28* (2006.01)
*B62K 25/04* (2006.01)

(52) U.S. Cl.
CPC ............... *B62K 25/283* (2013.01); *B62K 11/02* (2013.01); *B62K 25/04* (2013.01); *B62K 25/286* (2013.01)

(58) Field of Classification Search
CPC ..... B62K 25/283; B62K 25/286; B62K 25/04
USPC .......................................... 180/227; 280/284
See application file for complete search history.

(56) References Cited

U.S. PATENT DOCUMENTS

| | | | |
|---|---|---|---|
| 2,486,430 A | 11/1949 | Moore | |
| 4,393,954 A * | 7/1983 | Soucy et al. | 180/205.3 |
| 4,582,343 A | 4/1986 | Waugh | |
| 4,679,811 A | 7/1987 | Shuler | |
| 5,217,241 A * | 6/1993 | Girvin | 280/284 |
| 5,409,248 A | 4/1995 | Williams | |
| 5,487,443 A | 1/1996 | Thurm | |
| 5,570,896 A * | 11/1996 | Collins | 280/284 |
| 5,772,228 A * | 6/1998 | Owyang | 280/284 |
| 6,131,934 A | 10/2000 | Sinclair | |
| 6,406,048 B1 * | 6/2002 | Castellano | 280/284 |
| 6,505,847 B1 * | 1/2003 | Greene | 280/284 |
| 7,168,726 B2 * | 1/2007 | Klein | 280/284 |
| 7,374,191 B1 * | 5/2008 | Tseng | 280/284 |
| 7,380,808 B2 * | 6/2008 | D'Aluisio et al. | 280/275 |
| 7,392,874 B2 | 7/2008 | Koistra | |
| 7,546,894 B1 | 6/2009 | Glenn | |
| 7,559,396 B2 | 7/2009 | Schwindt | |
| 7,591,475 B1 * | 9/2009 | Calfee | 280/284 |
| 7,677,347 B2 | 3/2010 | Brawn | |
| 2007/0045024 A1 * | 3/2007 | Koistra et al. | 180/227 |

* cited by examiner

*Primary Examiner* — Kevin Hurley
*Assistant Examiner* — Marlon Arce
(74) *Attorney, Agent, or Firm* — Lee Palmateer Law Office LLC; Lee Palmateer (57) ABSTRACT

A motorcycle frame comprising a main frame and pivotless rear wheel suspension system. The main frame comprises frame members with threaded ends. The rear wheel suspension system comprises an axle block for each side of the wheel axle, with each axle block being releasably connected to the main frame by two members called absorbers that attenuate shock loads. Each absorber has a threaded end for threading to the threaded ends of the frame members. The other end of the absorbers is adapted to form a bolted connection with the axle block.

21 Claims, 8 Drawing Sheets

MOTORCYCLE FRAME SUSPENSION SYSTEM

CROSS-REFERENCE TO RELATED APPLICATIONS

This application claims the benefit under 35 U.S.C. §119 (e) of U.S. Provisional Patent Application Ser. No. 61/709,793 filed on Oct. 4, 2012, which is hereby incorporated herein by reference in its entirety.

TECHNICAL FIELD

The present invention relates to motorcycle frame suspension systems.

BACKGROUND OF THE INVENTION

Figures 5A, 5B, 5C:
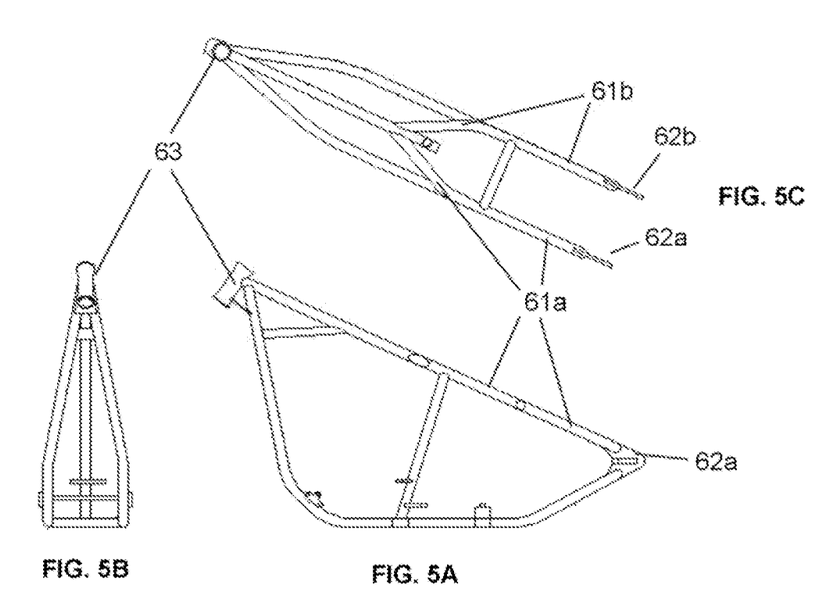
FIG. 5A is a side view sketch of a prior art rigid cycle frame.
FIG. 5B is a front view sketch of the prior art rigid cycle frame of FIG. 5A.
FIG. 5C is a plan view sketch of the prior art rigid cycle frame of FIG. 5A from the top looking down at an angle.

Rigid motorcycle frames offer simplicity in design, classic lines, a clean look, and ample space for placement of other motorcycle components. However, rigid frames provide relatively little shock dampening and a resulting rough ride. An example of a rigid frame is sketched in FIGS. 5A, 5B and 5C, which shows tubular frame members comprising left and right wishbone members 61a and 61b that connected to axle plates 62a and 62b and converged together on the centerline of the frame, at about mid-frame forward in FIG. 5C. Steering neck 63 is at the front of the frame.

Figure 7:
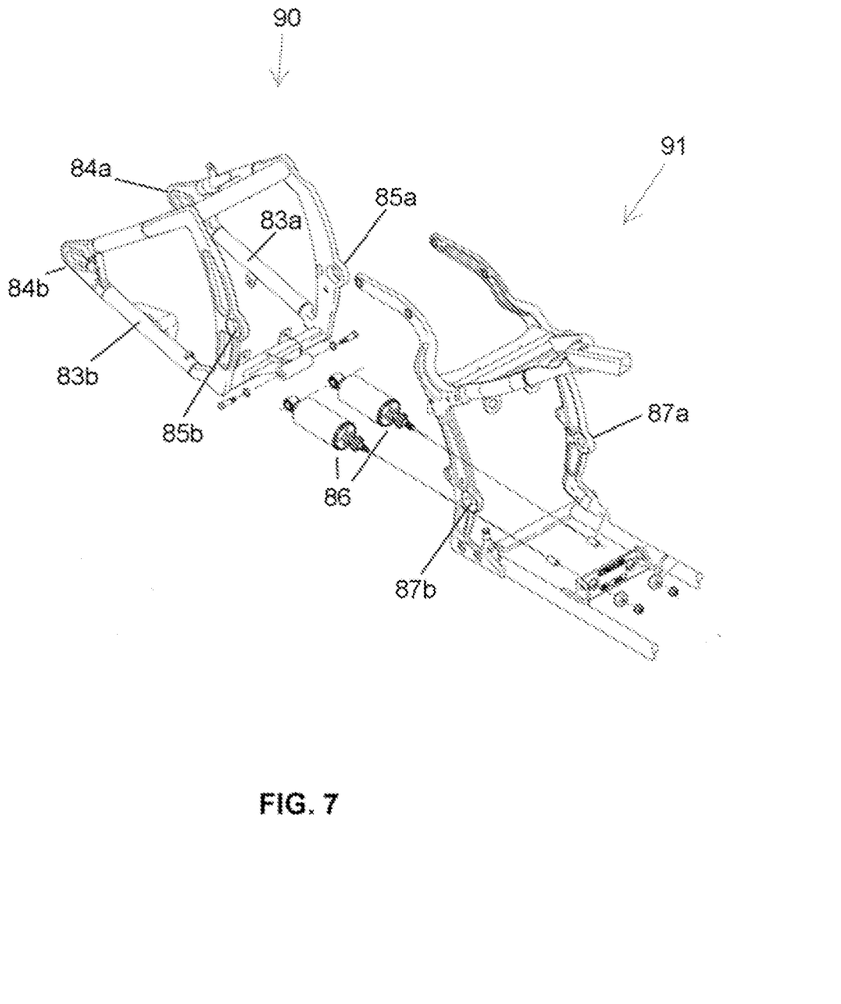
FIG. 7 is a perspective view sketch of parts of a prior art Softail® style frame.

Softail® style and "swing arm" style frames are two popular frame styles that provide suspension systems for a smoother, more comfortable ride. Softail® style frames, an example of which is partially sketched in FIG. 7, has a rear frame 90 that is pivotally mounted to the main frame 91 and one or two shock absorbers 86 mounted between the main frame and rear frame a distance away from the pivot axis, which axis runs through pivot connection features 85a, 85b, 87a and 87b. The shock absorbers stabilize the rear frame while allowing a range of rotational motion about the pivot axis under changing load conditions, and they attenuate shock loads imparted on the rear frame. They also attenuate the transfer of shock load from the rear frame to the main frame.

Figures 6A, 6B:
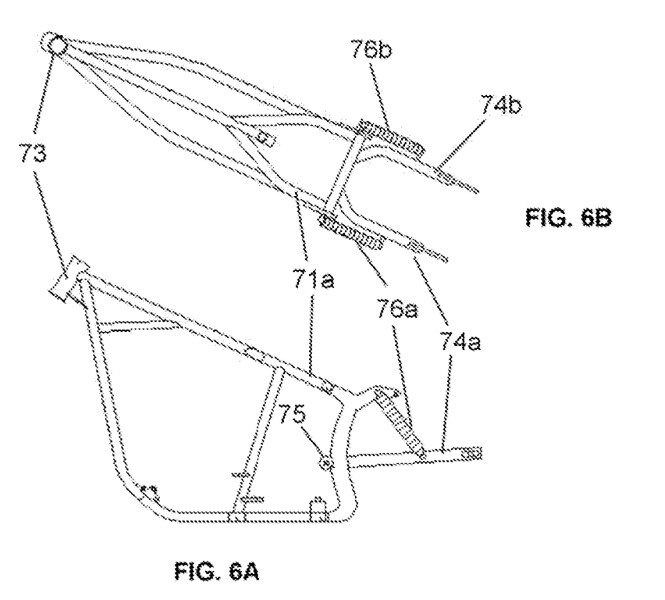
FIG. 6A is a side view sketch of a prior art swing-arm cycle frame.
FIG. 6B is a plan view sketch of the prior art swing-arm cycle frame of FIG. 6A from the top looking down at an angle.

The swing arm frame is another popular frame design, an example of which is roughly illustrated in FIGS. 6A and 6B, has a swing arm (with two forks 74a and 74b) pivotally mounted at pivot point 75 to the main frame and one or more shock absorbers 76a and 76b mounted between the arm and the main frame.

Softail® style and swing-arm style suspension systems are less attractive than rigid frames, occupy substantially more space in the frame compartment, and require significant maintenance. The rear pivot connection may have bearings which can wear out and require replacement, and the shock absorbers also require maintenance over time. These suspension systems, like in virtually every motorcycle rear-wheel suspension system are pivoting systems. Pivoting systems may restrain component movement to an arc shaped path, and are less effective at attenuating shock loads directed radially through the center of the pivot axis.

There is a need for a pivotless motorcycle suspension system. The terms "pivotless", "pivotless connection", "pivotless joint", and "pivotless suspension" hereinafter should be interpreted in the context of the foregoing background as referring to connections, joints or systems that are without structure creating a joint between two parts that allows the parts to move relative to one another in a swiveling (or "swinging") motion about the joint during operation of a motorcycle. There is a need for a motorcycle frame that provides classic lines, a clean look, and ample space for placement of other components like a rigid frame, while at the same time providing a suspension system for a smoother and more comfortable ride. There is a need for a suspension system that distributes force over four absorbers, provides more freedom of motion than an arc of a pivoting system, eliminates rigid shock dynamics in the radial direction through a pivot point, and simplifies maintenance.

The present invention fills those and other needs with an efficient design that requires few parts and low maintenance.

SUMMARY OF THE INVENTION

In a first aspect, the present invention provides a motorcycle rear wheel suspension system comprising a motorcycle frame, at least one axle block, and at least one absorber connecting the axle block to the frame. Each of said absorbers has a frame-side end and an axle-side end and has a connection to the motorcycle frame at the frame-side end and a connection to an axle block at the axle-side end.

In a second aspect, the present invention provides a pivotless motorcycle rear wheel suspension system comprising a plurality of interconnected members having longitudinal dimension, wherein at least one of said members has in-line absorbers integral thereto or connected therewith.

In a third aspect, the present invention provides a motorcycle frame comprising a plurality of frame members and a pivotless rear wheel suspension system comprising at least one absorber connected with and disposed in line with at least one of the plurality of frame members.

In a fourth aspect, the present invention provides a pivotless rear wheel motorcycle suspension system comprising at least one absorber connected with and disposed in line with at least one motorcycle frame member.

In a fifth aspect, the present invention provides a motorcycle rear wheel suspension system kit comprising an absorber with a threaded frame-side end for receiving a threaded end of a motorcycle frame member. The absorber also has an axle-side end and a lug provided with a through hole and extending from the axle-side end for receiving a connection with an axle block. The kit may further comprise an axle block adapted for assembly with the axle-side end of the absorber. The axle block has a through hole for aligning with the through hole of the lug and receiving a fastener to connect the axle block with the absorber.

In a sixth aspect, the present invention provides a motorcycle frame axle block, comprising a body having an aperture for receiving an axle and at least one hole for receiving a fastener.

In an seventh aspect, the present invention provides a method of constructing a motorcycle rear wheel suspension system comprising: providing an absorber having a first end and a second end wherein the first end is threaded for threading to a threaded motorcycle frame member; and providing an axle block adapted for assembly to the second end of the absorber. The method may comprise: providing a frame having at least one member with a threaded end; providing an absorber having a first end and a second end wherein the first end is threaded; threading the absorber to the at least one frame member so as to form a threaded connection between the absorber and frame member; providing an axle block; and connecting the second end of the absorber to the axle block.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings in which:

DETAILED DESCRIPTION OF THE INVENTION

Directional references herein may be with respect to a fully upright motorcycle to which the suspension system is operably assembled. The left and right side of the motorcycle are from the perspective of a forward facing person such as a rider.

For suspension system components that are disposed between the frame and rear axle, "frame side" or "frame end" refer to the side or end that is nearer the frame, and "axle side" or axle end" refer to the side or end that is nearer the axle.

The term "axle block" herein refers to the part of a motorcycle frame that has an aperture or other means for receiving one end of the rear wheel axle. An axle block can be integral to the frame or a separate part. Without limitation of the foregoing, parts commonly referred to as axle plates would be deemed to be an axle block. Multiple axle blocks on one side of the frame are considered to be one axle block. In existing motorcycle frames, axle blocks are securely and rigidly fixed to frame members.

The term "absorber" refers to a device, member or mechanism that employs known vehicle suspension system technologies or concepts to attenuate shock loads and oscillations of vehicle components. In cycle suspension systems, absorbers provide enhanced attenuation capabilities compared to typical structural frame members, such as tubes. Examples of typical absorber technologies used in shocks and struts of present day commercially available vehicle suspension systems include, without limitation, springs, pneumatic pistons, hydraulic pistons, gas-over hydraulic pistons, and combinations thereof such as coil-over shocks.

Figure 1:
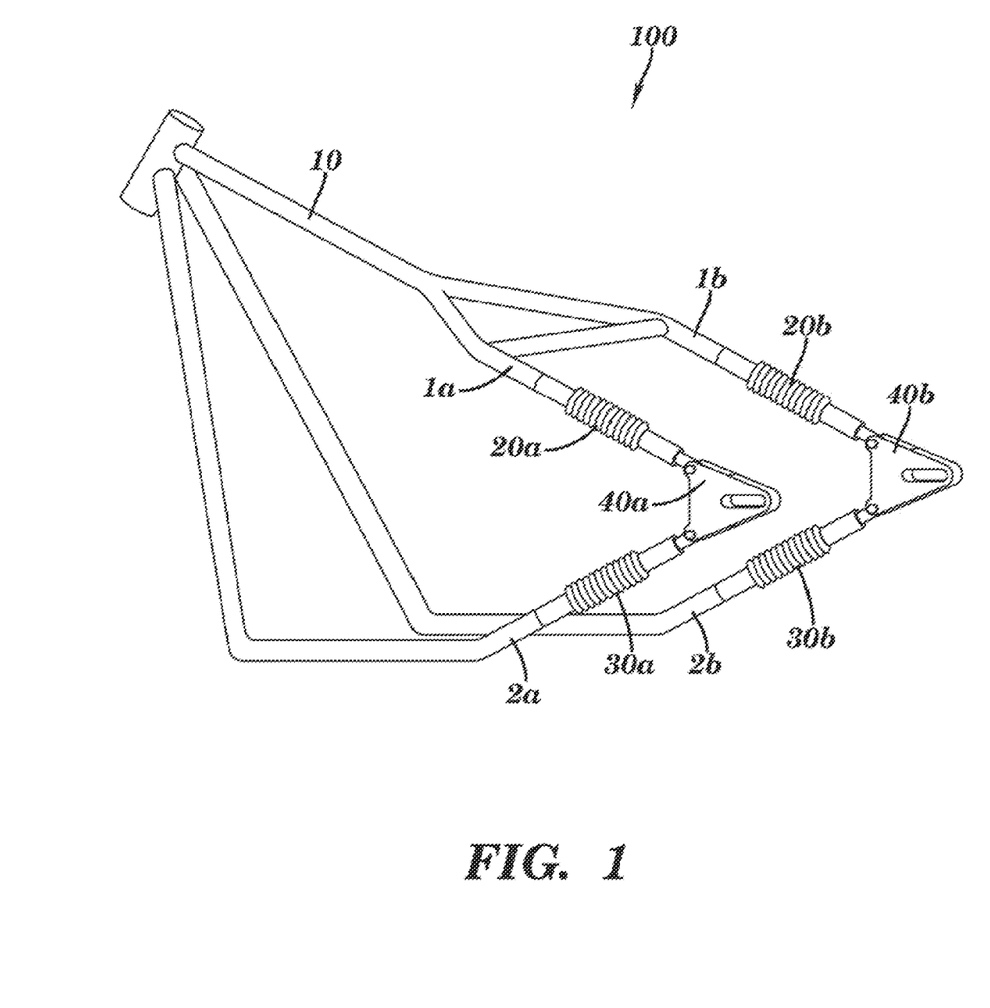
FIG. 1 is a perspective view of a preferred embodiment of a motorcycle frame of the present invention from the left.

With reference to FIG. 1, showing a preferred embodiment of a frame 100 of the present invention comprises a main frame 10 comprising four frame members 1a, 1b, 2a, and 2b, which may be longitudinally elongated or longitudinally truncated segments, connected at their ends respectively to absorbers 20a, 20b, 30a and 30b, which absorbers may be longitudinally elongated, and further comprising axle blocks 40a and 40b. On the left side of the frame, absorbers 20a and 30a are connected to axle block 40a at the rear end of the frame, and likewise on the right side of the frame, absorbers 20b and 30b are connected to axle block 40b. Axle blocks 40a and 40b are provided with apertures such as slots to cooperatively receive a rear wheel axle and form a connection between the rear wheel and the frame. The axle blocks are aligned horizontally across the frame from one another so that a rear wheel axle operably assembled therewith may be horizontal to the ground and perpendicular to the frame's vertical plane of symmetry.

In the preferred embodiment shown, the connections between the frame members, absorbers, and axle blocks are releasable through non-destructive methods. In other embodiments, any or all of the connections may be welded or connected by other methods requiring destructive disassembly.

Figure 2A:
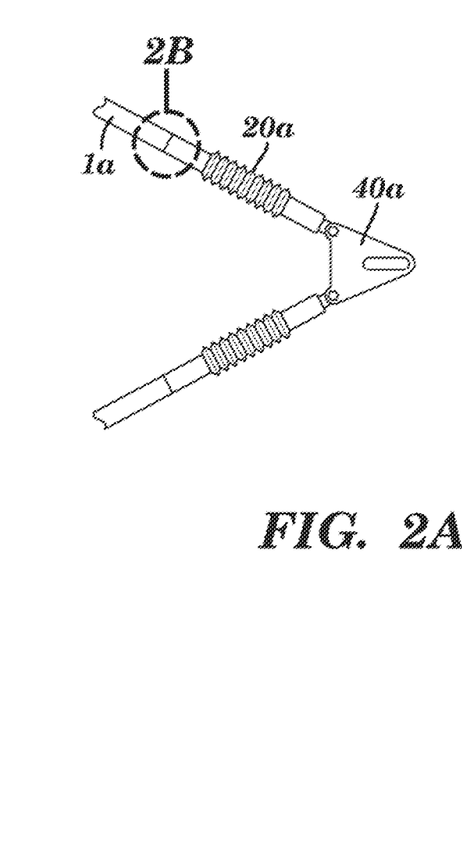
FIG. 2A is a side view of the left side suspension system of FIG. 1.
Figure 2B:
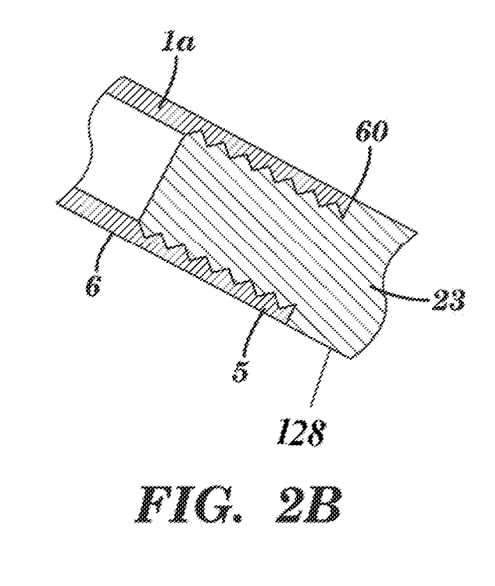
FIG. 2B is a close-up, cross section view of region 2B of FIG. 2A.
Figure 2C:
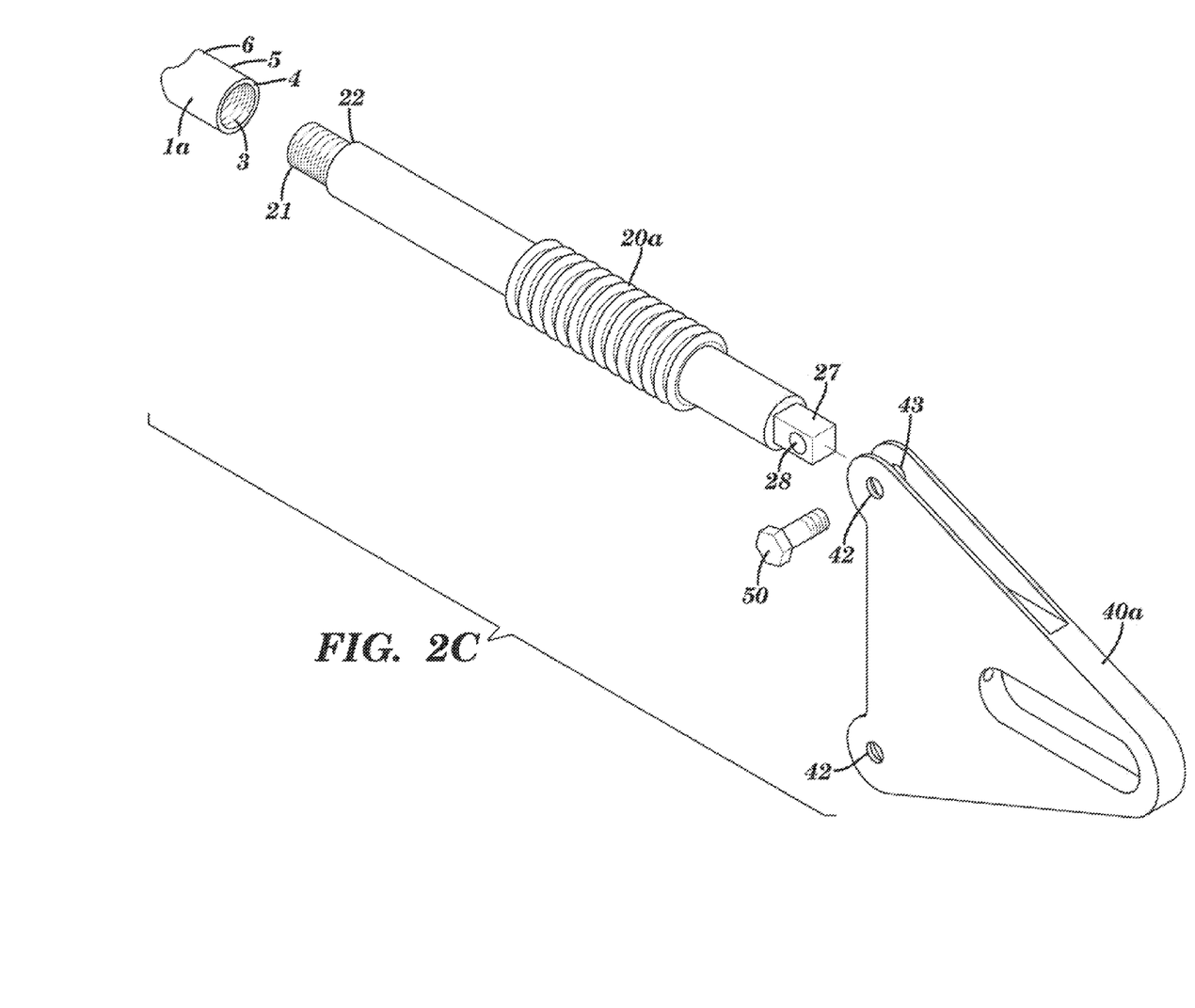
FIG. 2C is an exploded view of an assembly of the upper left portion of the suspension system of FIG. 1.

With reference to FIGS. 2A, 2B and 2C, frame member 1a comprises female (i.e., internal) threads 3 and end surface 4 disposed perpendicular to the frame member thread axis. The frame-side end of absorber 20a comprises a threaded end with male (i.e., external) threads 21 that are of corresponding size with threads 3 and further comprises a shoulder surface 22 disposed perpendicular to the absorber thread axis. The frame member and absorber are threaded together to form a threaded connection comprising preloaded threads and compressed joint 60 in which surfaces 4 and 22 are joined together. The frame member and absorber in the preferred embodiment are disposed so that their respective longitudinal axes are aligned and form a continuous projection.

In another embodiment, frame members may be provided with male threads and a shoulder surface, and absorbers with female threads and an end surface to form a threaded connection between the two components.

In some embodiments, the threaded portions of the frame members may be separately fabricated and connected to the rest of the member in a separate process such as welding.

The frame members and absorbers are shown in the preferred embodiment as having straight elongated shape, and the longitudinal direction is considered to be the direction of elongation. In other embodiments, the members and absorbers may have curvilinear or other non-linear longitudinal shape, in which case the longitudinal direction follows the curve or other non-linear shape.

With further reference to FIG. 2B, frame member 1a has outer surface 6 and proximal portion 5, which portion is proximal to joint 60 between the member and absorber.

With further reference to FIGS. 2A, 2B and 2C, the axle-side end of absorber 20a comprises lug 27 and through hole 28. The lug is shown as a longitudinal extension of the absorber, but it could be elsewise disposed such as a sideways protrusion outward from surface 29. Lug 27 is disposed in the space between two flanges of the axle block with its through-hole aligned with the holes 42 and 43 in the flanges. Threaded fastener 50 is disposed in the holes and threaded into tapped through hole 43. Thus, the absorber may be directly connected to the axle block without intermediary structural members. In the preferred embodiment, lug thickness may be the same or slightly less than the flange spacing and the threaded fastener is fastened tight, forming a tight joint in which the parts are fixed with respect to each other under loads anticipated in application. In the preferred embodiment, the lug has at least one flat surface for mating with at least one flat surface of the axle block, and the through holes of the respective parts are perpendicular to the flat surfaces of the respective parts.

Thus, the connections on either end of the absorber may be fixed connections with the connected parts fixed to one another, unlike shocks in pivoting suspension systems that have hinged connections to frame components allowing rotating movement between the connected parts.

With reference to FIGS. 4A-4D showing a preferred embodiment of the axle block, axle block 40a comprises a body with two upper and two lower flanges 45 extending from the body. The flanges define spaces 48 and 49 (FIG. 4C) between them for receiving the absorber lug. Through-holes 42 are provided in the upper and lower left-side flanges and tapped through holes 43 in the upper and lower right side flanges. Holes 43 are aligned horizontally with holes 42 so that they may cooperate to receive a pin, rod or threaded fastener. With reference to the axle block's orientation as assembled with an upright cycle, upper and lower through holes 42 are vertically spaced apart from one another. The body has an elongated aperture 46 located at an elevation between the elevations of the upper and lower through holes and offset a rearward horizontal distance from said holes, which aperture is for receiving an axle of a motorcycle rear wheel. The axle block is also provided with a threaded bore 44 for receiving a threaded rod used to adjust the location of the rear wheel axle in the aperture in the direction of the bore.

In other embodiments, the holes and apertures may be oriented in any variation of relative locations and spacing. For example, the aperture may not be horizontally offset or may be forwardly offset, and for further example, the holes may net have horizontal separation with or without vertical separation.

In the preferred embodiment shown in FIGS. 4A-4D, the axle block has right left-side flat surface 41a and right-side flat surface 41b that are parallel to one another and define a uniform thickness dimension of the entire block. For example, the thickness may be 1.25 inches or any other suitable thickness. The interior surfaces peripheral to and defining the through holes and apertures are oriented perpendicularly to said parallel surfaces, as are the threads of the tapped holes. Thus the through holes, tapped holes and aperture are all in alignment and parallel to one another.

In another embodiment, an untapped through hole may be provided in lieu of tapped through hole 43 and a nut may be provided to complete the threaded fastener connection, in which case the threaded end of the threaded fastener would protrude through the through hole and the nut would be tight against the right side of the axle block. The joint may be accomplished by other means such as welding or any other means suitable for cycle frame construction. In other embodiments, the joint may not be tight so as to allow rotation.

In yet another embodiment, the lugs and flanges may be provided with a plurality, of spaced apart through holes, preferably spaced apart in the longitudinal direction of the absorber, with a threaded fastener disposed in each set of aligned through holes in order to prevent rotation in the absorber/axle block joint. For example, with reference to FIG. 2C, lug 27 may be provided with a second through hole further forward on the lug, and the flanges provided with corresponding through holes aligned therewith, and a second threaded fastener may be disposed in the second set of through holes. Lug and flange dimensions may vary from those shown. In another embodiment, another fastening member, such as a pin may be disposed in the second set of through holes in lieu of the second threaded fastener.

In another embodiment, the axle block may be without spaced apart flanges and may have solid thickness throughout. In such an embodiment, body would comprise the entire block, and through hole 42 would be through the entire thickness and would be attachable to an absorber lug by aligning the lug and axle block through holes and inserting a fastening member through the holes, such as inserting a bolt that would be tightened with a nut.

In the preferred embodiment, assembly and disassembly of the suspension system is simplified over the prior art. With reference to FIG. 1 and FIGS. 2A, 2B and 2C, there are four joints on each of the left and right sides, including upper and lower frame-to-absorber joints ("$U_F$" and "$L_F$" joints) and upper and lower absorber-to-axle block joints ("$U_B$" and "$L_B$" joints). These four joints can be connected in any order, except either $U_B$ or $L_B$ must be the final joint connected. $U_B$ and $L_B$ may be initially joined loosely and then tightened after they are both initially connected.

For example, assembly of the left-side suspension system can be accomplished in the following order: thread the upper left absorber to the frame member 1a; thread the lower left absorber to the frame member 2a; bolt the upper left absorber loosely to axle block 40a with a first threaded fastener; bolt the lower left absorber loosely to axle block 40a with a second threaded fastener; and tighten the first and second threaded fasteners. Both the right and left side suspension systems may be assembled in the foregoing manner, independently of one another.

Disassembly can be accomplished by loosening and removing the threaded fasteners from the axle block joints, removing the axle block, and unthreading the absorbers from the frame members. The process of assembly and disassembly can be repeated with the same parts or replacement parts without destructive means. Thus, the present invention provides for improved repair and replacement.

As the left absorbers of the present invention may operate independently of the right side absorbers, and vice versa, there is a greater degree of independence from left to right as compared to pivoting suspension systems in which the left and right axle blocks are rigidly connected by structural components and the shocks are rigidly tied in to the same rigid components.

Figure 3A:
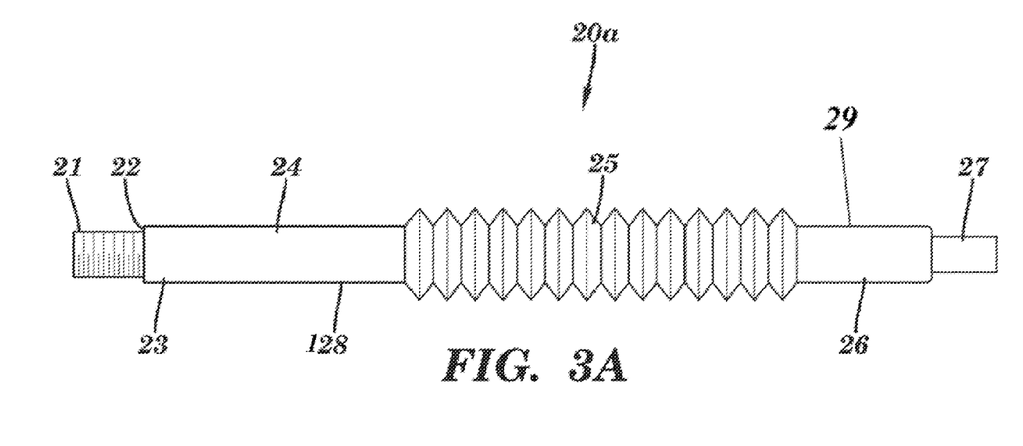
FIG. 3A is a top plan view of an absorber of the upper left portion of the suspension system of FIG. 1.
Figure 3B:
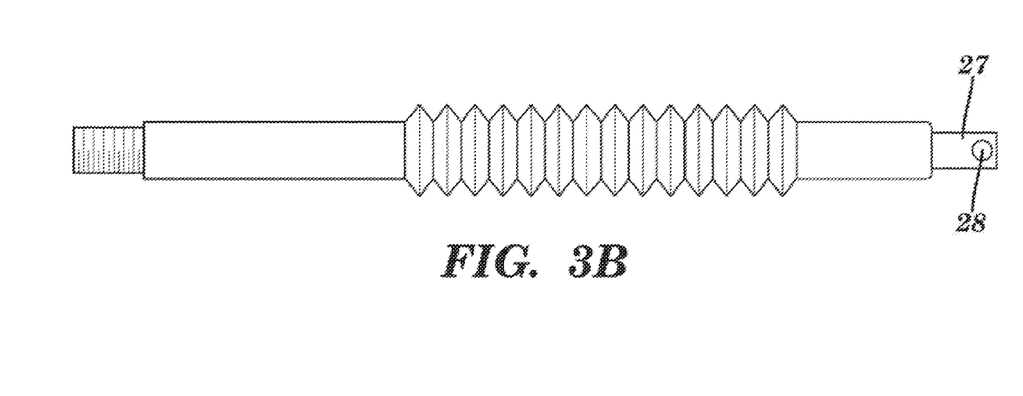
FIG. 3B is a side plan view of the absorber of FIG. 3A.
Figure 4A:
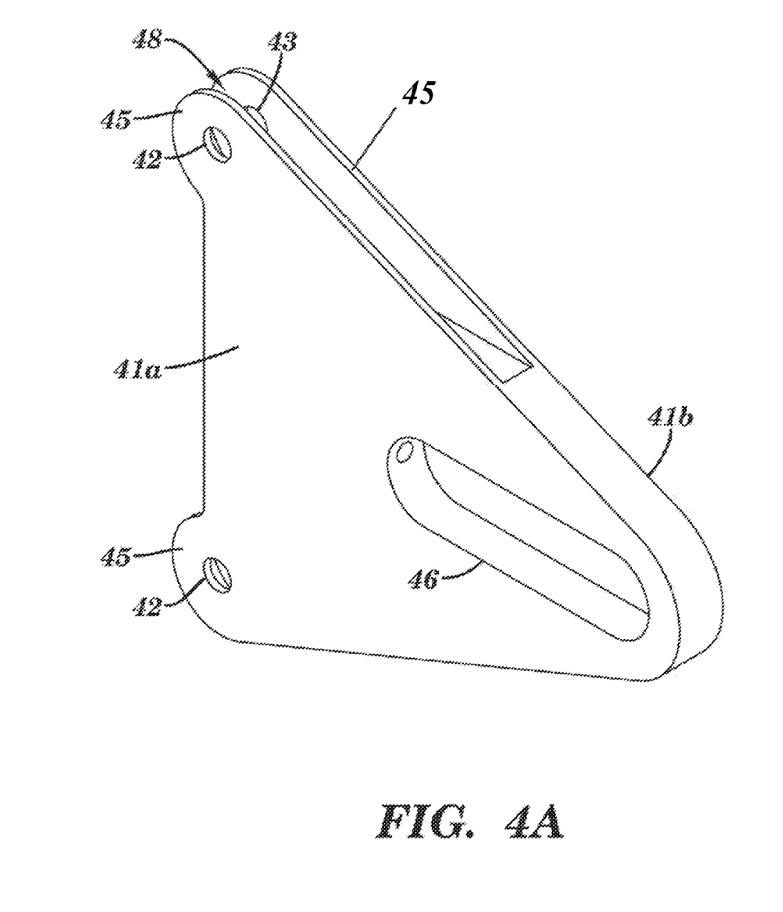
FIG. 4A is a perspective view of the axle block of FIG. 2A from the left.
Figure 4B:
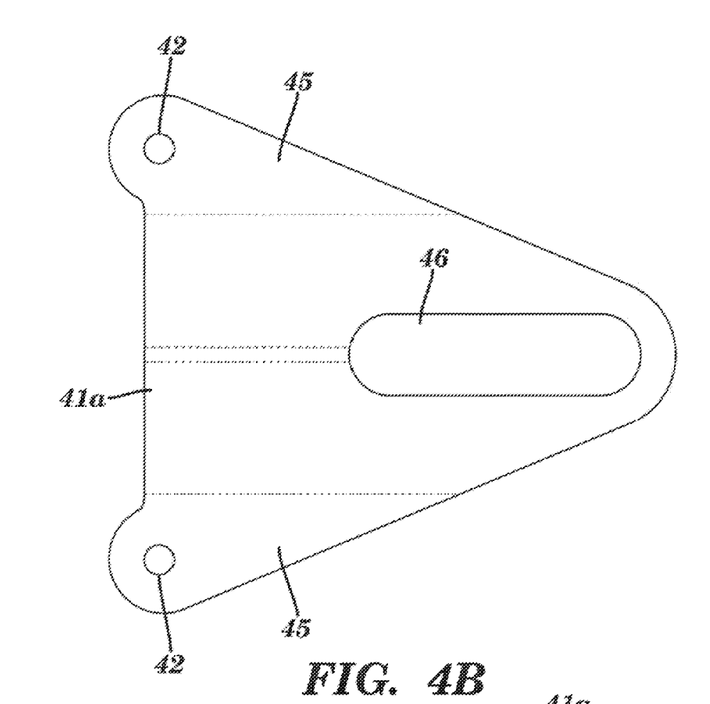
FIG. 4B is a plan view of the left side of the axle block of FIG. 4A.
Figure 4C:
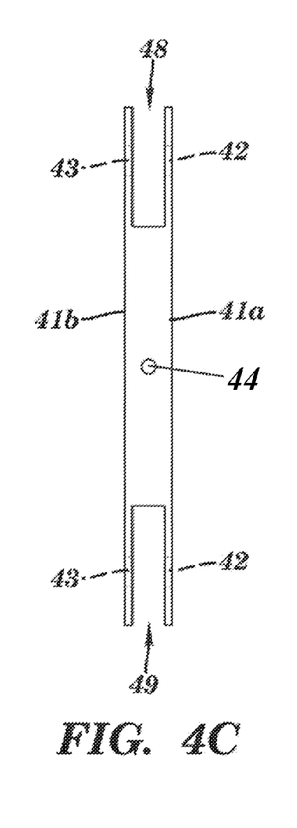
FIG. 4C is a side view of FIG. 4B.
Figure 4D:
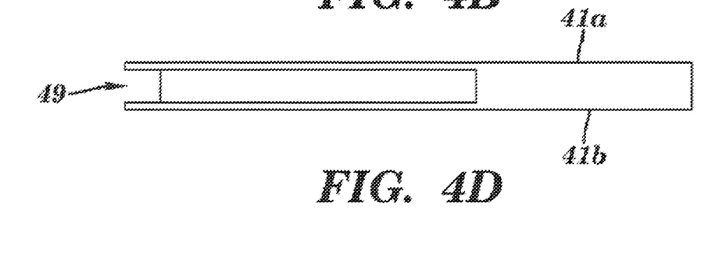
FIG. 4D is a bottom view of FIG. 4B.

With reference to FIGS. 3A and 3B, which shows an absorber having connecting structures of the preferred embodiment of the present invention, absorber 20a comprises a threaded end with male threads 21 for receiving corresponding female threads of a frame member, shoulder surface 22 adjacent to the threads, a proximal portion 23 adjacent to the shoulder, and a lug 27 and through hole 28. In this preferred embodiment, part 24 of the absorber may comprise a cylinder that contains liquid and an over-gas and that cooperates with a piston that travels in the cylinder to provide hydraulic attenuation of shock loads and spring responses. Part 26 may comprise a connection to said piston. The absorber may further comprise a spring connected at one end to part 26 and the other end to part 24 so that the spring deflects with the relative displacement of the cylinder and piston so as to provide further shock load attenuation. The absorber shown, further comprises an optional boot 25 covering the spring and providing a barrier against entry of foreign substances. In other embodiments of the present invention, any suitable absorber technology and configuration may be used.

The direction in which the absorber is designed to most effectively attenuate shock loads is considered to be the design attenuation direction. In the preferred embodiment, the design attenuation direction is in the longitudinal direction of the cylinder, piston rod, and coil spring helix axis.

Thus, in the preferred embodiment, the design attenuation direction is coincident with the longitudinal direction of the frame member to which the absorber is attached. The present invention thus provides rigid frame geometry while simultaneously providing design attenuation in line with the line of the structural frame members, which is considered "in-line" attenuation or "in-line" suspension. Thus the absorbers are considered to be disposed "in line" with the frame members.

In further reference to FIGS. 3A and 31, absorber comprises cylindrical surfaces 128 and 29 that are sized and shaped to model the appearance of being a continuation of the frame member to which they are attached. In the preferred embodiment, the cylindrical surfaces have the same diameter as the frame member to which the absorbers are attached. Thus, in the preferred embodiment, the transverse cross sections of the frame member and absorber may have the same exterior size and shape. In other embodiments the peripheral size and shape of the absorber cross-section may differ from that of the frame member, and may have varying cross sectional shape, such as tapering or any other variation along the longitudinal direction.

With reference also to FIG. 2B, it is preferred that the circumferential size and shape of outer surface 128 of proximal portion 23 of the absorber conform to that of surface 6 of proximal portion 5 of frame member 1a so as to model the appearance of a continuous member across the joint.

The operational characteristics of the suspension system and overall ride characteristics of the cycle are affected by the length of the absorbers and the angles at which the upper and lower absorbers are disposed relative to vertical and horizontal planes. The desired absorber angles and lengths are affected by frame geometry comprising frame member dimensions and bend angles. Axle block dimensions also affect absorber lengths and angles. Therefore, frame geometry, absorber geometry, and axle block geometry all cooperate to affect suspension system performance and overall ride characteristics.

While the preferred embodiment may comprise upper and lower absorbers disposed at symmetrical angles relative to a horizontal plane, it may comprise absorbers disposed at asymmetrical angles. For example, an upper left absorber may be disposed at a first angle to horizontal, and a lower left absorber may be disposed at a second angle having the same value as the first angle. In other embodiments, the first and second angles may have different values. In addition, the upper and lower absorbers may be of equal length or of different lengths from each another.

Although frame members 1a, 1b, 2a, and 2b in the preferred embodiment are shown as straight cylindrical tube sections, in other embodiments they may have bends and may be of any cross sectional shape. Likewise, although the absorbers are shown as straight and cylindrical in the preferred embodiment of FIGS. 1 through 3B, in other embodiments they may have other cross sectional shapes and may have bends such as bends in the proximal portion 23 and axle-side end 26 of FIGS. 2A and 2B.

While in the preferred embodiment all four connections between the axle blocks and the frame comprise attenuation means in the form of in-line absorbers, in other embodiments one or more of those connections may not comprise in-line absorbers, and instead may be without attenuation means. For example one or more unattenuated connections may be rigid connections or free-sliding connections, such as a rod in a cylinder, in which two components may freely slide with respect to one another.

While the invention has been particularly shown and described with reference to certain embodiments, it will be understood by those skilled in the art that various changes in form and details may be made to the invention without departing from the spirit and scope of the invention as described in the following claims.

I claim:

1. A motorcycle rear wheel suspension system comprising:
   a motorcycle frame;
   at least one axle block;
   at least one absorber having a frame-side end, an axle-side end, a pivotless fixed first connection to the motorcycle frame at the frame-side end and a second connection to an axle block at the axle-side end;
   at least one absorber having a frame-side end, an axle-side end, a first connection to the motorcycle frame at the frame-side end and a second connection to one axle block at the axle-side end;
   wherein:
      a first of said at least one absorbers is disposed on one side of the frame and connected at one end to a frame member and connected at the other end to an axle block; and
      a second of said at least one absorbers is disposed on the same side of the frame as the first absorber and connected at one end to a frame member and connected at the other end to the same axle block.

2. The suspension system of claim 1 wherein at least one of the first and second connections of at least one absorber is a releasable connection.

3. The suspension system of claim 1 wherein at least one absorber is disposed in line with the frame member to which it is attached.

4. A motorcycle rear wheel suspension system comprising:
   a motorcycle frame;
   at least one axle block;
   at least one absorber having a frame-side end, an axle-side end, a pivotless fixed first connection to the motorcycle frame at the frame-side end and a second connection to an axle block at the axle-side end;
   wherein:
      the at least one axle block comprises a right side axle block and a left side axle block; and
      the at least one absorber comprises at least one right side absorber having a second connection only to the right side axle block, and at least one left side absorber having a second connection only to the left side axle block.

5. The suspension system of claim 4 wherein the first and second connections of at least one absorber are releasable connections.

6. The suspension system of claim 4 wherein at least one of the first and second connections of at least one absorber is a releasable connection.

7. A motorcycle rear wheel suspension system comprising:
   a motorcycle frame;
   at least one axle block; and
   at least one absorber having a frame-side end, an axle-side end, a first connection to the motorcycle frame at the frame-side end and a second connection to an axle block at the axle-side end; wherein
   the at least one axle block comprises a right side axle block and a left side axle block;
   the at least one absorber comprises at least one right side absorber having a second connection only to the right side axle block, and at least one left side absorber having a second connection only to the left side axle block;
   the at least one right side absorber comprises a first right side absorber connected to the frame at a point higher than the point where it is connected to the right side axle block, and a second right side absorber connected to the frame at a point lower than the point where it is connected to the right side axle block; and the at least one left side absorber comprises a first left side absorber connected to the frame at a point higher than the point where it is connected to the left side axle block, and a second left side absorber connected to the frame at a point lower than the point where it is connected to the left side axle block.

8. The suspension system of claim 7 wherein at least one of the first and second connections of at least one absorber is a releasable connection.

9. A motorcycle rear wheel suspension system comprising:
a motorcycle frame;
at least one axle block
at least one absorber having a frame-side end, an axle-side end, a pivotless fixed first connection to the motorcycle frame at the frame-side end and a second connection to an axle block at the axle-side end;
wherein;
at least one frame member comprises an end surface and a proximal portion proximal to the end surface;
at least one absorber comprises a shoulder surface and a proximal portion proximal to the shoulder surface;
said frame member and absorber are attached together so as to form a joint in which said end surface is in flush contact with said shoulder surface; and
the proximal portion of the absorber and the proximal portion of the frame member have substantially the same circumferential size and shape.

10. The suspension system of claim 9 wherein at least one of the first and second connections of at least one absorber is a releasable connection.

11. A motorcycle rear wheel suspension system comprising:
a motorcycle frame;
at least one axle block;
at least one absorber having a frame-side end, an axle-side end, a pivotless fixed first connection to the motorcycle frame at the frame-side end and a second connection to an axle block at the axle-side end;
wherein:
at least one absorber comprises an axle-side end having a lug and a first through hole through the lug for receiving the shaft of a fastener; and
at least one axle block comprises a second through hole for receiving the shaft of a fastener, said second through hole aligned coaxially with the lug through hole;
said suspension system further comprising:
a threaded fastener disposed through the first and second through hole so as to connect the absorber to the axle block.

12. The suspension system of claim 11 wherein at least one of the first and second connections of at least one absorber is a releasable connection.

13. A motorcycle rear wheel suspension system comprising:
a motorcycle frame;
at least one axle block; and
at least one absorber having a frame-side end, an axle-side end, a first connection to the motorcycle frame at the frame-side end and a second connection to an axle block at the axle-side end; wherein at least one absorber comprises an axle-side end having a lug and a first through hole through the lug for receiving the shaft of a fastener; and
at least one axle block comprises:
a first and a second spaced apart flanges forming a space between them for receiving the absorber lug;
a second through hole through the first flange for receiving the shaft of a fastener, said second through hole aligned with the lug through hole; and
a tapped hole through the second flange for receiving the shaft of a fastener, said tapped hole aligned with the first flange through hole and lug through hole;
said suspension system further comprising:
a threaded fastener disposed through the first and second through hole and threaded into the tapped hole so as to connect the absorber to the axle block.

14. The suspension system of claim 13 wherein at least one of the first and second connections of at least one absorber is a releasable connection.

15. A motorcycle frame comprising:
a plurality of frame members; and
a pivotless rear wheel suspension system comprising
at least one absorber connected with and disposed in line with at least one of the plurality of frame members;
wherein:
the plurality of frame members comprises four frame members each having a threaded end for receiving a threaded end of an absorber;
the at least one absorber comprises four absorbers each having a threaded end threadedly connected to one of said frame members.

16. The suspension system of claim 15 wherein the threaded connections are releasable connections.

17. A motorcycle frame axle block adapted to provide a pivotless connection of the rear wheel axle to the frame, comprising:
a rigid body adapted for pivotless and releasable connection to the frame, said body having an aperture for receiving an axle and at least one hole for receiving a fastener for providing a pivotless and releasable connection of the body to the frame
wherein the body further comprises at least a first and second flange forming a space between the flanges for receiving an object to which the block will be connected;
and wherein said at least one hole comprises a first hole in the first flange and a second hole in the second flange aligned with the first hole so that the two holes may cooperatively receive said fastener.

18. A method of constructing a motorcycle rear wheel suspension system comprising;
providing a first absorber having a first end and a second end wherein the first end is threaded for threading to a threaded motorcycle frame member;
providing a second absorber having a first end and a second end wherein the first end is threaded for threading to a threaded motorcycle frame member;
providing at least one axle block adapted for assembly to the second end of at least one of said absorbers;
providing a frame with a right side and left side and having at least two members with a threaded end;
threading the first absorber to a first of said frame members so as to form a first threaded connection between the absorber and frame member on one of said sides of the frame;

threading the second absorber to a second of said frame members so as to form a second threaded connection between the absorber and frame member on one of said sides of the frame;

connecting the second end of said first absorber to one of the at least one axle blocks on the same side of the frame as the first threaded connection; and connecting the second end of said second absorber to one of the at least one axle blocks on the same side of the frame as the second threaded connection.

19. The method of claim 18 wherein the connecting steps comprise connecting the first and second absorbers to the same axle block on the same side of the frame.

20. The method of claim 18 wherein the connecting steps comprise connecting the first and second absorbers to separate axle blocks on opposite sides of the frame.

21. The method of claim 18 wherein:

the threading the first absorber step further comprises disposing the absorber in line with the frame member;

the threading the second absorber step further comprises disposing the absorber in line with the frame member.

\* \* \* \* \*